United States Patent
Iketani et al.

(10) Patent No.: US 7,368,652 B2
(45) Date of Patent: May 6, 2008

(54) MUSIC SEARCH SYSTEM AND MUSIC SEARCH APPARATUS

(75) Inventors: Naoki Iketani, Kanagawa (JP); Masanori Hattori, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 213 days.

(21) Appl. No.: 11/239,119

(22) Filed: Sep. 30, 2005

(65) Prior Publication Data

US 2006/0065105 A1 Mar. 30, 2006

(30) Foreign Application Priority Data

Sep. 30, 2004 (JP) ............................ P2004-288433

(51) Int. Cl.
*G04B 13/00* (2006.01)
*G10H 7/00* (2006.01)
(52) U.S. Cl. ..................... 84/609; 84/610; 84/602; 84/649; 84/650
(58) Field of Classification Search ................ None
See application file for complete search history.

(56) References Cited

U.S. PATENT DOCUMENTS

| 6,987,221 B2 * | 1/2006 | Platt ........................ 84/601 |
| 7,193,148 B2 * | 3/2007 | Cremer et al. ............ 84/635 |
| 2003/0100967 A1 | 5/2003 | Ogasawara | |

FOREIGN PATENT DOCUMENTS

| CN | 1411595 A | 4/2003 |
| JP | 2003-142511 | 5/2003 |
| JP | 2004-033492 | 2/2004 |
| JP | 2004-348275 | 12/2004 |
| WO | WO 98/49630 | 11/1998 |
| WO | WO 03/063025 A2 | 7/2003 |

OTHER PUBLICATIONS

Iketani et al., "Rhythmical Input User Interface 'Ta-Ta-Ta-Tap'", 4A-4, (2004).
Takeda et al., "A Rhythm Recognition Method using Rhythm Vectors", No. 46, (2002).
M. Goto, "A Real-time Music Scene Description System: A Chorus-Section Detecting Method," 2002-MUS-47-6 (Oct. 2002) 2002:27-34, with partial English-language translation and Abstract.

(Continued)

*Primary Examiner*—Marlon T Fletcher
(74) *Attorney, Agent, or Firm*—Finnegan, Henderson, Farabow, Garrett & Dunner, L.L.P.

(57) ABSTRACT

A time-series signal input section 205 inputs a time-series signal whose on state and off state are repeated alternately. A similar rhythm search section 206 searches a plurality of pieces of rhythm data stored in a data storage section for rhythm data having the same fluctuation pattern as or a similar fluctuation pattern to the time-series signal input to the time-series signal input section 205. A music-associated information storage section 204 stores music-associated information associated with the piece of music corresponding to the rhythm data in association with the rhythm data. A search result generation section 207 generates the search result using the music-associated information (information of title, etc.,) stored in association with the found rhythm data and outputs the search result through a search result output section 208.

5 Claims, 10 Drawing Sheets

OTHER PUBLICATIONS

European Search Report and search opinion issued by the European Patent Office on Jan. 8, 2007, for European Patent Application No. 05255543.0.

Eisenberg et al., "BeatBank—An MPEG-7 compliant Query by Tapping System," Audio Engineering Society Convention Paper 6136 (May 8-11, 2004), pp. 1-7.

Magee, "Toshiba Develops interesting new music search," http://www.theinquirer.net (Apr. 23, 2004).

Kirovski et al., "Beat-ID: Identifying Music via Beat Analysis," IEEE Radar Conference (May 5-8, 2003), pp. 190-193.

Tzanetakis, "Musescape: A Tool for Changing Music Collections into Libraries," Springer-Verlag (2003). pp. 412-421.

Jang et al., "Query by Tapping: A New Paradigm for Content-Based Music Retrieval from Acoustic Input," http://www.springerlink.com (2001), pp. 590-597.

Notification of the First Office Action issued by the Chinese Patent Office on Jul. 27, 2007, for Chinese Patent Application No. 200510097847.7, and English-language translation thereof.

* cited by examiner

FIG. 4

| MUSIC DATA ID (CID) | MUSIC DATA |
|---|---|
| MUS0001 | melody01. mmf |
| MUS0002 | melody02. mmf |
| MUS0003 | melody02. mmf |
| MUS0004 | Sound01. pmd |
| MUS0005 | Sound02. mp3 |
| MUS1000 | Sound03. wav |
| ⋮ | ⋮ |

FIG. 6

| CID | RHYTHM DATA |
|---|---|
| MUS0001 | 480, 240, 240, 240, 240, 240, 720, 480, 480, •••• |
| MUS0002 | 300, 100, 200, 300, 100, 200, 300, 100, •••• |
| MUS0003 | 240, 240, 240, 240, 240, 240, 240, 2160, 240, •••• |
| MUS0003 | 240, 480, 480, 240, 240, 240, 1920, 240, 480, 480, •••• |
| MUS0003 | 240, 480, 480, 480, 240, 1920, 240, 480, 480, 480, •••• |
| MUS0004 | 765, 153, 306, 153, 306, 153, 918, 918, 765, 153, •••• |
| ⋮ | ⋮ |

$Ri = \{300, 400, 600, 200, 200, 200, 1500, 200\}$

| ORDER | CID | SIMILARITY DEGREE s |
|---|---|---|
| 1 | MUS0003 | 0.8 |
| 2 | MUS0001 | 0.3 |
| 3 | MUS0002 | 0.2 |
| ⋮ | ⋮ | ⋮ |

FIG. 10

| CID | TITLE | MUSIC GENRE | COMPOSER NAME | SONGWRITER NAME | URL WHERE DATA EXISTS |
|---|---|---|---|---|---|
| MUS0001 | TITLE 1 | J-POP | NAME 11 | NAME 12 | URL 1 |
| MUS0002 | TITLE 2 | ENKA | NAME 21 | NAME 22 | URL 2 |
| MUS0003 | TITLE 3 | CLASSIC | NAME 31 | NAME 32 | URL 3 |
| ⋮ | ⋮ | ⋮ | ⋮ | ⋮ | ⋮ |

FIG. 11

FIRST CANDIDATE : "TITLE 3" (SIMILARITY DEGREE=0.8)

| GENRE | CLASSIC |
|---|---|
| COMPOSER NAME | NAME 31 |
| SONGWRITER NAME | NAME 32 |
| URL | URL 3 |

SECOND CANDIDATE : "TITLE 1" (SIMILARITY DEGREE=0.3)

| GENRE | J-POP |
|---|---|
| COMPOSER NAME | NAME 11 |
| SONGWRITER NAME | NAME 12 |
| URL | URL 1 |

THIRD CANDIDATE : "TITLE 2" (SIMILARITY DEGREE=0.2)

| GENRE | ENKA |
|---|---|
| COMPOSER NAME | NAME 21 |
| SONGWRITER NAME | NAME 22 |
| URL | URL 2 |

MUSIC SEARCH SYSTEM AND MUSIC SEARCH APPARATUS

RELATED APPLICATIONS

The present disclosure relates to the subject matter contained in Japanese Patent Application No. 2004-288433 filed on Sep. 30, 2004, which is incorporated herein by reference in its entirety.

BACKGROUND OF THE INVENTION

1. Field of the Invention

The present invention relates to a music search system and apparatus for searching for music, a musical piece, a song, etc.

2. Description of the Related Art

As a music search method in a related art, a method of entering information associated with music, such as a title or a performer (artist), as a character string and searching for it is generally known.

In addition, as a method of searching for music or information concerning music (for example, artist of performer, etc.), the following search methods based on input are known:

(1) A mobile telephone is held to the sound source of music produced in the surrounding of a searcher and the sound is input to an apparatus.
(2) Voice waveform of hummed tune is input.
(3) A search is made for music based on performance information of a keyboard instrument, etc.
(4) A scale string representing syllable names in a character string, such as do re mi fa, is input for searching for music.
(5) A chord progression of music (series of harmony of C, G7, etc.,) is input for searching for music containing the chord progression.

The music search methods in the related arts are characterized by the fact that any of at least timbre, melody, or harmony among rhythm, timbre, melody, and harmony of components of music is input.

In contrast, a method of playing back sound by inputting a time-series signal, namely, rhythm only is proposed in JP-A-2003-142511. A similar methods are disclosed in the following documents:

Naoki Iketani, Masanori Hattori, Akihiko Oosuga: "Rhythm inputting interface "Ta-ta-ta-tap"," Jyouhoushori gakkai dai66kai zen'kokutaikai 4A-4, 2004

Haruto Takeda, Kouichi Shinoda, Shigeki Sagayama, et al.: "Rhythm recognition using Rhythm vector," Jyouhoushori gakkai ken'kyuu houkoku "On'gaku jyouhou kagaku" No. 46,2002

A data searching method by inputting a time-series signal, namely, rhythm only is proposed in JP-A-2004-033492.

SUMMARY OF THE INVENTION

However, in the music search method based on input of a time-series signal in the documents described above, the rhythm identifying method is not refined and the music search method lacks effective components to make the most of the method as a music search method.

The conventional methods also lack effective components to implement the method as a search method for ringer music in a mobile telephone.

It is therefore one of objects of the invention to make a music search apparatus based on rhythm input easier to use and easier to implement.

According to a first aspect of the invention, there is provided a music search system including: a music search apparatus; and a music search terminal, wherein the music search apparatus includes: an input unit that inputs a time-series signal represented by on/off signals; a data storage unit that stores a plurality of pieces of rhythm data in association with music-associated information associated with music corresponding to the rhythm data; a search unit that searches the plurality of pieces of rhythm data stored in the data storage unit for rhythm data having the same fluctuation pattern as or a similar fluctuation pattern to the time-series signal input to the input unit; and a search result output unit that reads the music-associated information stored in association with the rhythm data found by the search unit from the data storage unit and outputs the read music-associated information as the search result of the search, wherein the music search terminal includes: a communication unit that communicates with the music search apparatus via a communication line; a operation unit that inputs the time-series signal to the input unit through the communication unit; a receiving unit that receives the search result of the input time-series signal through the communication unit from the search result output unit; and a display unit that displays the received search result.

According to a second aspect of the invention, there is provided a music search apparatus including: an input unit that inputs a time-series signal represented by on/off signals; a data storage unit that stores a plurality of pieces of rhythm data in association with music-associated information associated with music corresponding to the rhythm data; a search unit that searches the plurality of pieces of rhythm data stored in the data storage unit for rhythm data having the same fluctuation pattern as or a similar fluctuation pattern to the time-series signal input to the input unit; and a search result output unit that reads the music-associated information stored in association with the rhythm data found by the search unit from the data storage unit and outputs the read music-associated information as the search result of the search.

According to a third aspect of the invention, there is provided a music search method including: inputting a time-series signal represented by on/off signals; storing a plurality of pieces of rhythm data in association with music-associated information associated with music corresponding to the rhythm data; searching the plurality of pieces of rhythm data for rhythm data having the same fluctuation pattern as or a similar fluctuation pattern to the time-series signal; reading the music-associated information found by the search; and outputting the read music-associated information as the search result of the search.

According to a fourth aspect of the invention, there is provided a computer-readable program product for causing a computer system to execute procedures for searching a music, including: inputting a time-series signal represented by on/off signals; storing a plurality of pieces of rhythm data in association with music-associated information associated with music corresponding to the rhythm data; searching the plurality of pieces of rhythm data for rhythm data having the same fluctuation pattern as or a similar fluctuation pattern to the time-series signal; reading the music-associated information found by the search; and outputting the read music-associated information as the search result of the search.

BRIEF DESCRIPTION OF THE DRAWINGS

The above objects and advantages of the present invention will become more apparent by describing in detail exemplary embodiments thereof with reference to the accompanying drawings, wherein:

FIG. 4 is a drawing to show a composition example of data stored in a rhythm data storage section 201;

FIG. 6 is a drawing to show a composition example of data stored in a rhythm data storage section 203;

FIG. 10 is a drawing to show an example of information relevant to ringer tone stored in a music-associated information storage section 204;

FIG. 11 is a drawing to show an example of the finally output search result;

DETAILED DESCRIPTION OF THE PREFERRED EMBODIMENTS

Referring now to the accompanying drawings, a description will be given in detail of embodiments of the invention.

First Embodiment

Figure 1:
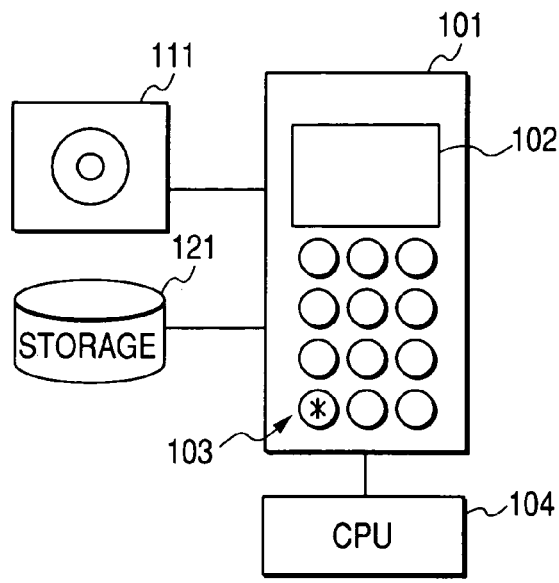
FIG. 1 is a drawing to show the configuration of a music search apparatus based on rhythm input according to an embodiment of the invention.

FIG. 1 is a drawing to show the configuration of a music search terminal, such as a mobile telephone, based on rhythm input according to an embodiment of the invention. In the embodiment, by way of example, a music search terminal 101 of mobile telephone type is included.

The embodiment typically is implemented as a computer controlled by software. The software in this case includes a program and data, the functions and effects of the invention are provided by making the most of computer hardware physically, and appropriate related arts are applied to portions where the related arts can be applied. Further, the specific types and configurations of hardware and software for embodying the invention, the software processing range, and the like can be changed as desired. Therefore, in the description that follows, a virtual function block diagram indicating the component functions of the invention as blocks is used. A program for operating a computer to embody the invention is also one form of the invention.

Figure 2:
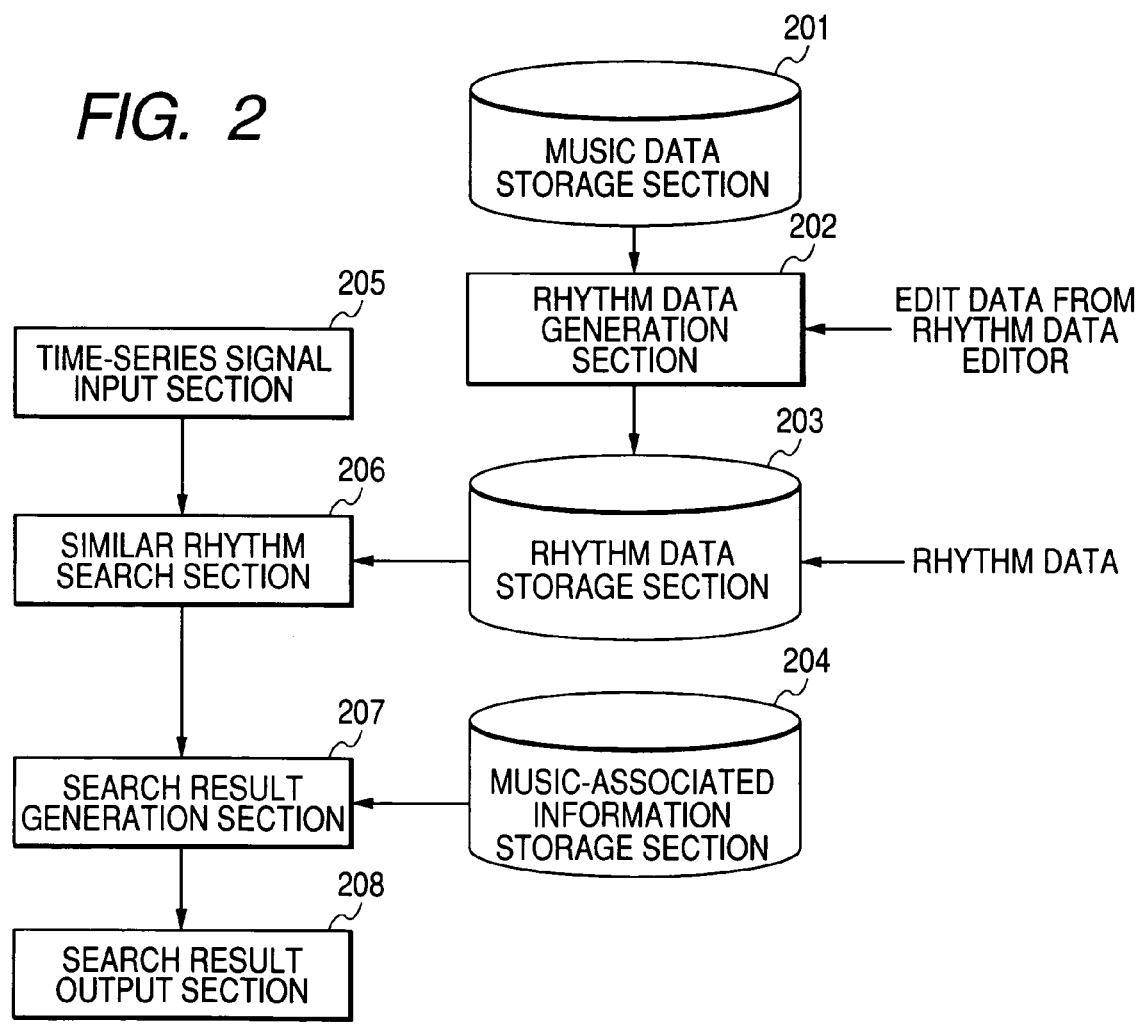
FIG. 2 is a function block diagram to show the configuration of a music search apparatus based on rhythm input according to the embodiment.

FIG. 2 is a function block diagram to show the configuration of a music search apparatus based on rhythm input according to the embodiment of the invention.

First, an outline of each function block will be discussed before the detailed description of the embodiment.

In FIG. 2, a music data storage section 201 has a function of storing music data to search for in the format of ringer melody in ".mmf" format, ringer melody in SMAF format, a kind of ringer music, MIDI format, "Chaku-uta (registered trademark in Japan)" format of audio data, linear PCM code audio format, MPEG1 AUDIO Layer 3 format, etc. The music data storage section 201 is implemented as a record medium such as memory or a hard disk, for example.

A rhythm data generation section 202 receives music data input from the music data storage section 201 and further input of edit data of a rhythm data editor as required and generates rhythm data fitted to each piece of music, used as a search key in searching for music for each piece of music and then registers the rhythm data in a rhythm data storage section 203. The rhythm data fitted to each piece of music is data formed as rhythm assumed to be entered by the user in searching for the piece of music or a rhythm group containing the rhythm; generally the rhythm of the beginning portion, the characteristic portion, and the theme of music becomes rhythm data for input music. That is, the rhythm data generation section 202 generally generates the rhythm data of the beginning, the characteristic portion, the theme, etc., of input music data as registered rhythm data.

The theme is not necessarily the fitted rhythm. Thus, rhythm data may be created for each of a plurality of parts contained in MIDI data.

To generate MIDI data from a WAVE file of linear PCM code audio format, a spectrum analysis of audio is conducted and mechanical conversion may be executed, for example, using "MuseBook(R) Wav2Midi Version 1.0, or using a technique employed in a computer software called "Saifunotatsujin". Alternatively, it is also possible to generate rhythm data directly from the WAVE file or the MPEG1 AUDIO Layer 3 format depending on music data. For example, if music involves vocals, the vocal signal is extracted through an analog filter for performing signal processing of narrowing down to the voice frequency band; further, in music data of stereo audio, using the fact that the vocal part is fixed at the center and a chorus and other instrumental sounds are fixed at the left and right other than the center, the vocal signal can be extracted more precisely. For the vocal signal thus extracted, the portion where the sound volume or the sound volume change rate is high is assumed to be vocalization and the time is recorded, whereby song rhythm can be generated.

Further, to automatically generate rhythm data from music data, a known art of detecting the time of a characteristic portion is used together, whereby the rhythm data of the characteristic portion assumed to be entered by the user can be generated with high accuracy. The characteristic portion detection technology is described in the following document: "Masataka Gotou: "Real time musical scene description system: Sabikukan ken'shutsushuhou," Jyouhoushori gakkai On'gakujyouhoukagaku ken'kyuukai ken'kyuu houkoku 2002-MUS-47-6, Vol. 2002, No. 100, pp. 27-34, October 2002."

A rhythm data storage section 203 retains the rhythm data generated by the rhythm data generation section 202 and provides the rhythm data for a similar rhythm search section 206. The rhythm data storage section 203 is implemented as memory in a computer, for example.

A time-series signal input section 205 inputs a music rhythm signal input by a music searcher as a search key for searching for music (input time-series signal) and outputs the input signal to the similar rhythm search section 206 as input time-series signal. The time-series signal input section 205 may have a function capable of detecting time change of ON/OFF and can be implemented as any of various machines such as not only various keys and buttons of a keyboard of a personal computer (PC), a mouse, buttons of a mobile telephone, and buttons of a remote control, but also a touch panel and an infrared sensor.

The similar rhythm search section 206 inputs the input time-series signal input from the time-series signal input section 205 and the rhythm data retained in the rhythm data storage section 203, searches for rhythm data similar to the signal pattern of the input time-series signal, and outputs the search result to a search result generation section 207.

A music-associated information storage section 204 is a section for retaining titles, composer names, songwriters, performer names, a part or all of words, URL where music data exists, music data, etc., associated with music in association with the music data, and is implemented as memory in a computer, for example.

The music-associated information storage section 204 may further retain syllable names, score data, words, or sound data associated with music.

The search result generation section 207 inputs the search result of the similar rhythm search section 206, references the music-associated information from the music-associated information storage section 204 in response to the search result as required, and generates output data for outputting the search result to the music searcher. For example, from the search result of the similar rhythm search section 206, as relevant information to the found rhythm data, the title, the composer name, the songwriter, the performer name, a part or all of words, the URL where the music data corresponding to the rhythm data exists, the music data, and the like are output as a set to a search result output section 208 as output data.

The search result output section 208 outputs the output data generated by the search result generation section 207 to the searcher. For example, the data is output as screen information or sound information with the mobile telephone used for the search.

Next, the case implemented as a ringer tone search apparatus for the mobile telephone user as the most typical embodiment will be discussed containing the specific configurations of the function blocks. Throughout the specification, the mobile telephone may be any type of mobile telephone including PHS, a mobile telephone involved in radio LAN communications, etc.

Throughout the specification, the ringer tone refers to a sound produced to inform the mobile telephone user that a telephone call or mail comes in the mobile telephone, and contains not only a musical piece, but also a voice only.

Operation of Mobile Telephone

Figure 3:
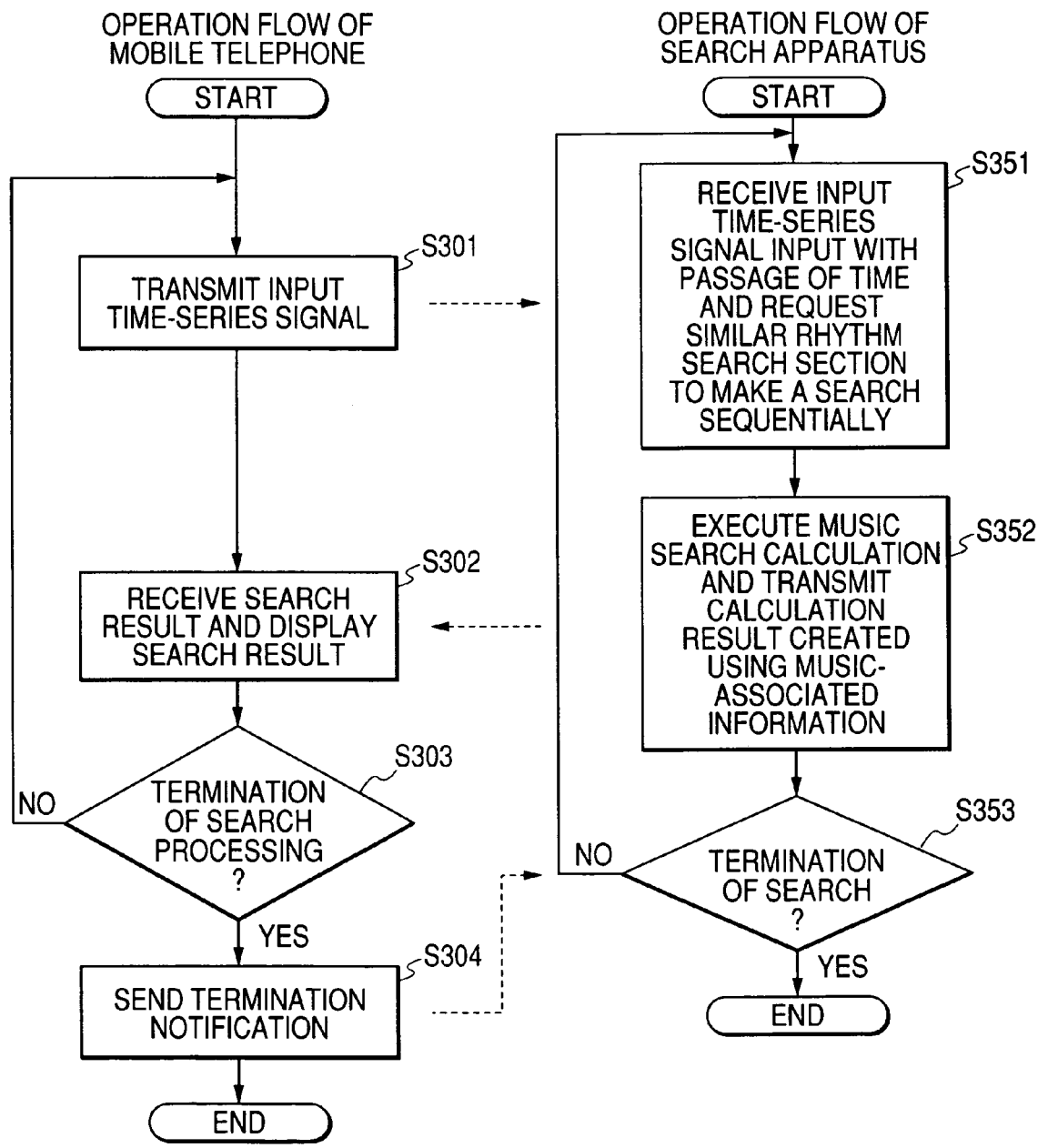
FIG. 3 is a flowchart to describe the mobile telephone operation and the search apparatus operation.

The operation of mobile telephone is executed according to a procedure shown in FIG. 3.

(Step S301) Mobile telephone 101 transmits an input time-series signal to search apparatus via a radio communication line. To input the input time-series signal, for example, rhythm is input using one button of the mobile telephone and the input time-series signal is transmitted to the search apparatus in sequence.

(Step S302) The mobile telephone 101 receives the search result from the search apparatus via the radio communication line and outputs the search result to a display 102 or a speaker 111 of the mobile telephone 101.

(Step S303) To terminate the ringer tone search processing, the mobile telephone 101 goes to step S304; to continue the ringer tone search processing, the mobile telephone 101 returns to step S301.

(Step S304) The mobile telephone 101 sends a search processing termination notification to the search apparatus via the radio communication line and terminates the processing.

Operation of Search Apparatus

The operation of the search apparatus is executed according to a procedure shown in FIG. 3.

(Step S351) The search apparatus receives the input time-series signal input in sequence from the mobile telephone via the radio communication line, passes the input time-series signal to the similar rhythm search section 206 in sequence, and makes a search request for searching for rhythm data similar to the input time-series signal.

(Step S352) The search apparatus executes search in sequence with the passage of time and outputs the search result produced using music-associated information related to the found rhythm data to the mobile telephone via the radio communication line. In the example, it is assumed that the title and the performer name among the title, the composer name, the songwriter, the performer name, a part or all of words, the URL where the music data exists, and the music data are used as the music-associated information.

(Step S353) To continue the search, the search apparatus returns to step S351; to terminate the search, the processing is terminated.

Thus, the user of the mobile telephone continues to input rhythm with one button of the mobile telephone, whereby the search apparatus searches the rhythm data storage section 203 in sequence for the rhythm data having rhythm similar to the input time-series signal and transmits the rhythm data to the mobile telephone.

Consequently, with the mobile telephone, the music searcher can obtain in sequence the search result of playing back the possible ringer tone to be found, seeing the title of the ringer tone, etc.

If the music-associated information storage section 204 can also retain the syllable names, the score data, the words, or the sound data associated with the piece of music, the music searcher can also check them as the search result.

In the example, the input time-series signal is transmitted in sequence from the mobile telephone to the search apparatus, which then executes search in sequence. However, the invention is not limited to it. Search may be executed with input of a search execution button pressed on the mobile telephone as a trigger. In this case, for example, the music searcher using the mobile telephone 101 inputs the input time-series signal for a given time and then presses the search execution button for transmitting the input time-series signal for the given time to the search apparatus. With pressing the search execution button as a trigger, the search apparatus may search the rhythm data storage section 203 for the rhythm data having rhythm similar to the input time-series signal and may transmit the rhythm data to the mobile telephone. In this case, the mobile telephone needs to have a function for acquiring the input time-series signal.

As the search result, ringer tone data or data to acquire ringer tone (link information with ringer tone data, ringer tone, or the like) is transmitted to the mobile telephone, whereby the user of the mobile telephone can download any desired ringer tone from the search result.

The search apparatus will be discussed below in detail for each function block:

The data stored in the music data storage section 201 is data for enabling music to be played back using a computer; for example, it includes data in SMAF (Synthetic music Mobile Application Format) represented by extension ".mmf," a typical data format of ringer melody, and data in SMF (Standard Midi File) format represented by extension ".mid," a more general MIDI standard format, as shown in FIG. 4. In addition, the data covers general music data, such as ringer melody data known as extension ".pmd," Chakuuta (registered trademark in Japan) having extension ".amc," etc., data with extension ".wav" called WAVE format, and data with extension ".mp3" in AUDIO Layer 3 format. In the music data storage section 201, the music data is stored in association with music data ID. Here, the music data ID is called CID. The music data storage section 201 can be implemented as a record medium such as memory or a hard disk in a server computer.

Next, the rhythm data generation section 202 inputs music data from the music data storage section 201 and generates rhythm data fitted to each piece of music for each piece of music. As a typical example, a method of inputting music data in the SMF format and generating rhythm data is shown. Briefly, music data in the MIDI format including SMF is like digital data of score information and is made up of tempo of music and timbre, duration, pitch, etc., of separate sound. The rhythm data generation section 202 excludes the timbre information and the pitch information from the data, extracts the duration information, and converts it into data.

Figure 5:
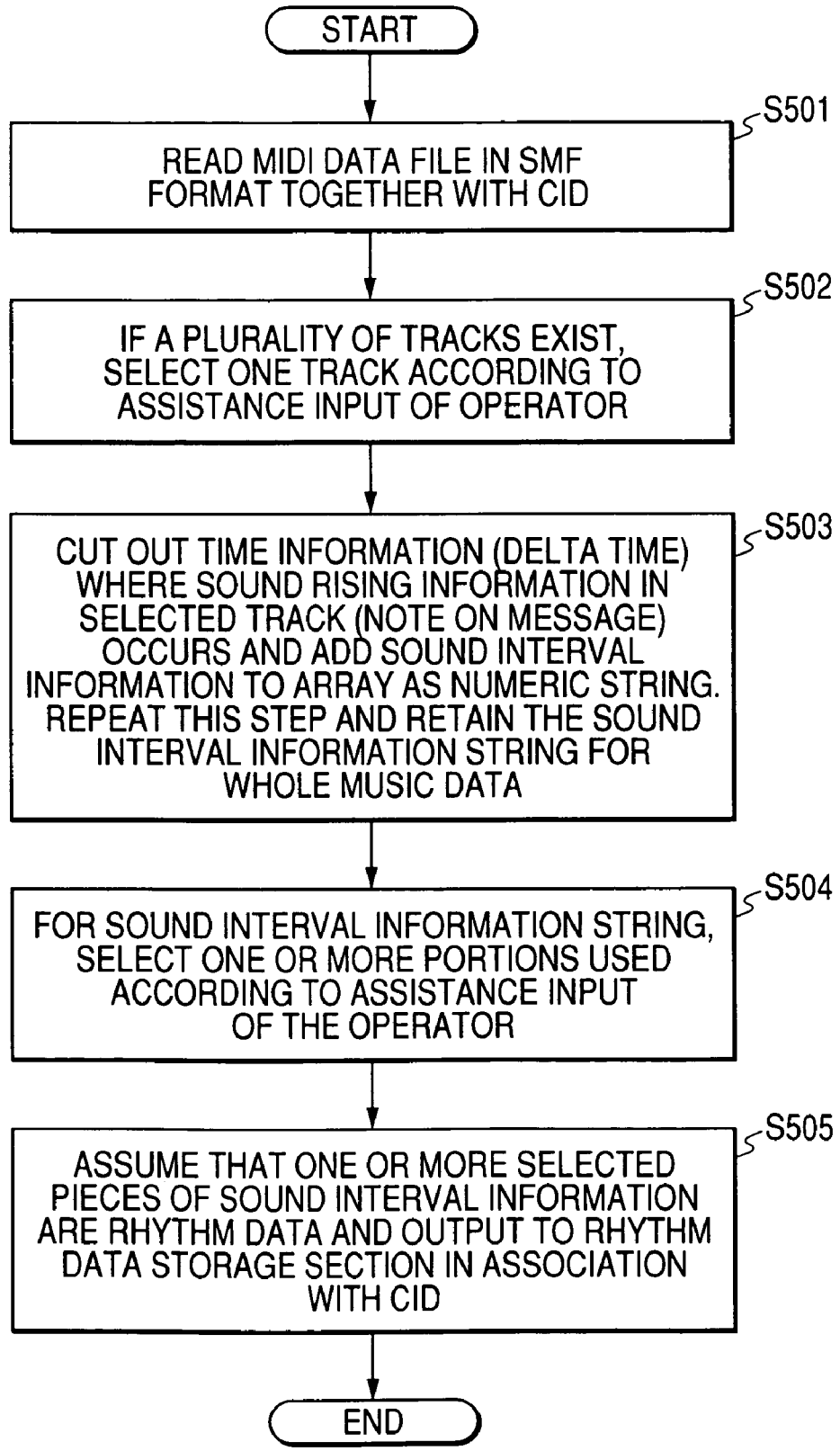
FIG. 5 is a flowchart to show a processing flow of rhythm data generation.

A processing flow of the rhythm data generation will be discussed with FIG. 5.

(Step S501) MIDI data file in the SMF format is read together with the CID from the music data storage section 201.

(Step S502) If a plurality of tracks exist in the MIDI data, one track is selected according to assistance input of the operator.

(Step S503) Time information (delta time) where sound rising information in the selected track (note on message) occurs is cut out and sound interval information is added to an array as a numeric string. This step is repeated and the sound interval information string for the whole music data is retained.

(Step S504) For the sound interval information string, one or more portions used as rhythm data are selected according to assistance input of the operator.

(Step S505) One or more pieces of sound interval information selected at step S504 are output to the rhythm data storage section 203 as the rhythm data in association with the CID.

The processing section described above may be accomplished using any of various known GUI functions in related arts.

In the embodiment, as the rhythm data, the time interval string of keying is indicated, separated by a comma in millisecond units, and rhythm data r is represented as follows:

r={r1, r2, r3, . . . , rn}

For example, if the rhythm is made up of four times of keying of "ta, _, ta, ta, ta" (where _ denotes a one-beat rest symbol), there are three keying intervals. Thus, for example, assuming that one beat is 250 milliseconds, the rhythm data r is represented as r={500, 250, 250}. In the embodiment, the rhythm data generation section 202 is implemented as a CPU and a program of a server computer.

The rhythm data storage section 203 is a function block for retaining the rhythm data in association with the identifier; typically, it is implemented as storage of a computer. In the embodiment, the rhythm data storage section 203 is constructed as memory or a hard disk of a server computer and memory of a mobile telephone.

The rhythm data storage section 203 retains not only the rhythm data generated and output in the rhythm data generation section 202, but also the rhythm data created outside the search apparatus and the rhythm data manually entered by the user.

FIG. 6 shows a composition example of the data stored in the rhythm data storage section 203. The rhythm data storage section 203 stores the CID of the music data ID and the rhythm data in association with each other.

The time-series signal input section 205 outputs the time change of ON/OFF entered by the enterer to the similar rhythm search section 206 as an input time-series signal train.

The time-series signal input section 205 is an input unit that can detect at least one or more ON/OFF states; typically it is implemented as a button of a mechanical part involving electronic output. In the embodiment, it is a part of the mobile telephone of the searcher. The button and the circuit for receiving the button signal correspond to the time-series signal input section 205. The time-series signal input section 205 can be implemented not only as the mobile telephone, but also as a keyboard, a mouse, etc., of PC, a touch panel, a remote control button, etc., if it can detect the ON/OFF state, as described above.

The similar rhythm search section 206 inputs the input time-series signal train, selects rhythm data similar to the fluctuation pattern of the signal, and outputs the similarity degree between one or more candidates and input patterns as a set to the search result generation section 207.

In the embodiment, the similar rhythm search section 206 is implemented as a server computer and a CPU and a program of a mobile telephone. Typically, it is implemented as a program of a computer for converting the input signal train into rhythm data and then performing calculation using an algorithm for calculating the similarity between two rhythms.

Figure 7:
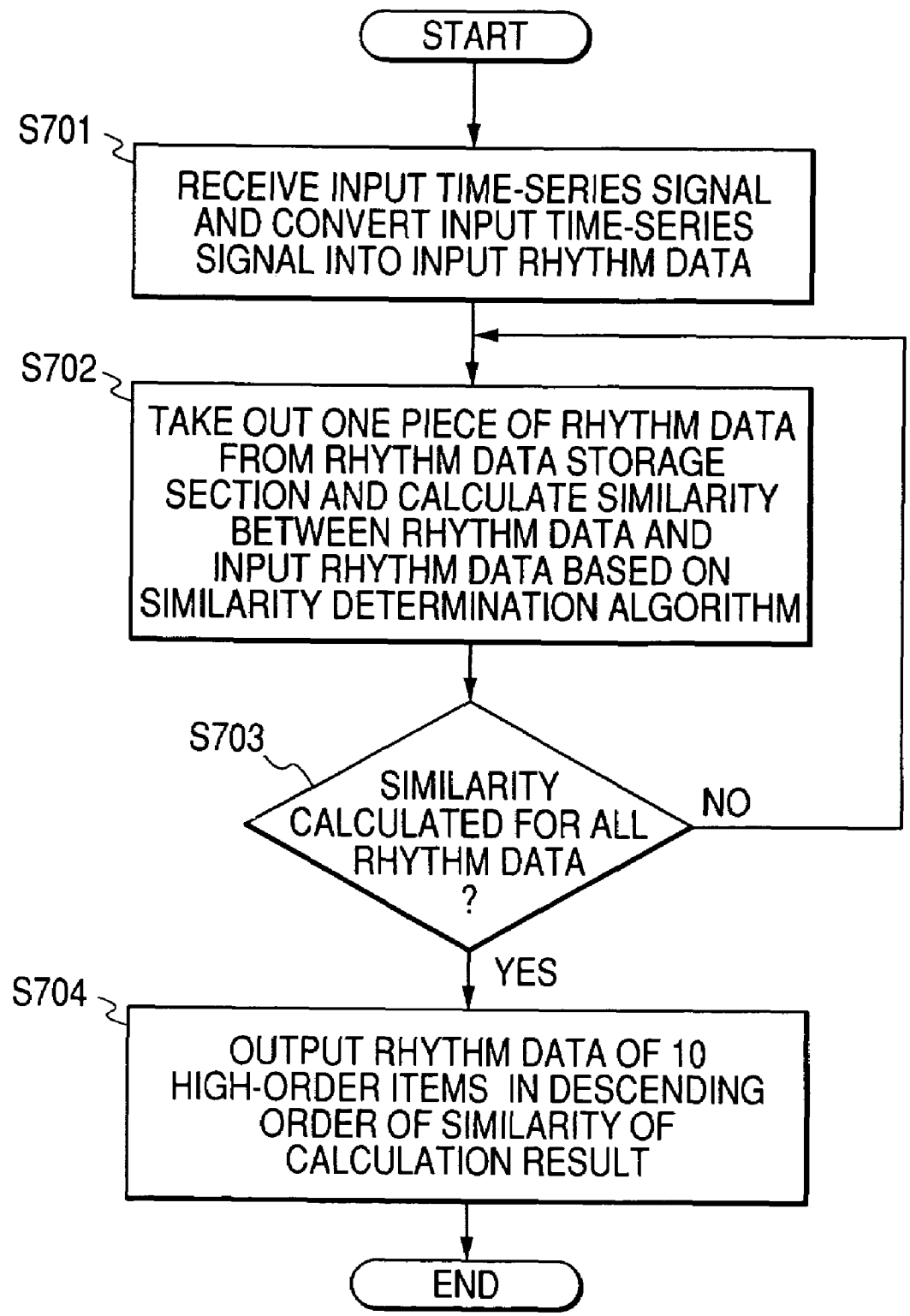
FIG. 7 is a flowchart to show a processing flow of similar rhythm search conducted by a similar rhythm search section 206.

An example of a processing flow of similar rhythm search conducted by the similar rhythm search section 206 will be discussed with FIG. 7.

(Step S701) The similar rhythm search section 206 receives the input time-series signal from the time-series signal input section 205 and converts the input time-series signal into input rhythm data.

(Step S702) One piece of rhythm data is taken out from the rhythm data storage section 203 and the similarity between the rhythm data and the input rhythm data is calculated based on a similarity determination algorithm.

(Step S703) If the similarity is not calculated for all rhythm data, the process returns to step S701 and the processing is repeated; if the similarity is calculated for all rhythm data, the process goes to step S704.

(Step S704) The CIDs and the similarity degrees s for the three high-order pieces of rhythm data in the descending order of the rhythm similarity of the calculation result are output to the search result generation section 207 and the processing is terminated.

Figures 8, 9:
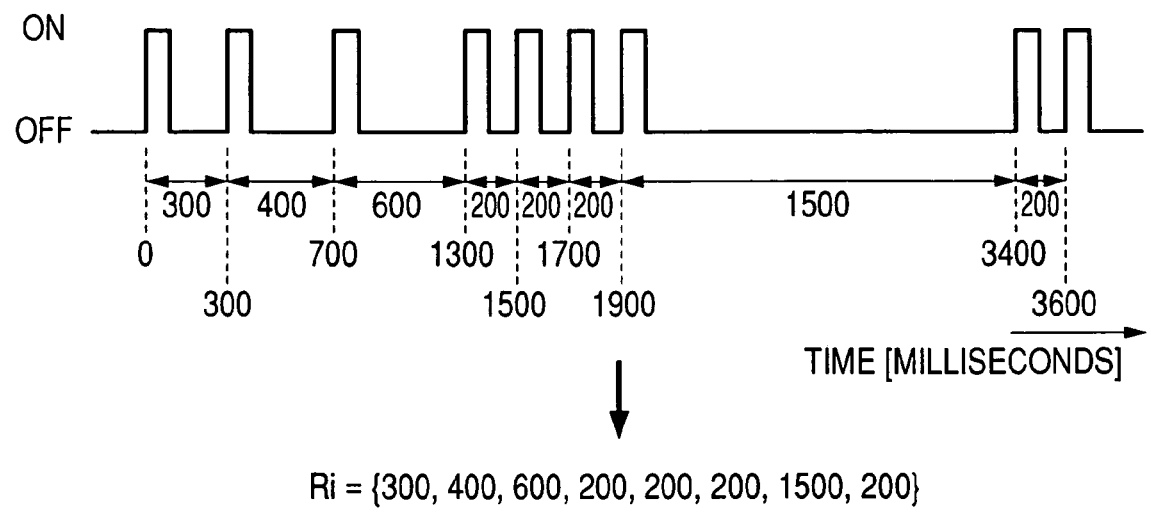
FIG. 8 is a drawing to describe a procedure of converting an input time-series signal train into rhythm data.
FIG. 9 is a drawing to show an example of the similar rhythm search result.

In the embodiment, the procedure of converting the input time-series signal train into the rhythm data is an easy procedure according to which the time at which the OFF-to-ON state transition is made is detected, each time interval is described in millisecond units, and the time interval string is converted into data separated by a comma, as shown in FIG. 8.

As the algorithm for determining the similarity between two pieces of rhythm data, a calculation method according to a rhythm vector technique in non-patent documents 1 and 2, a similarity degree calculation method according to the differential square sum, a similarity degree calculation method using dynamic programming, etc., can be used. In the embodiment, the similarity degree calculation method according to the differential square sum technique is adopted, and the calculation method will be discussed below:

Let the input rhythm data into which the input time-series signal train is converted be $R_i$ and the rhythm data acquired from the rhythm data storage section 203 be $R_j$.

$$R_i = \{r_{i1}, r_{i2}, r_{i3}, \ldots, r_{in}\}$$

$$R_j = \{r_{j1}, r_{j2}, r_{j3}, \ldots, r_{jn}, \ldots, r_{jm}\}$$

Distance d between the two rhythms is calculated as follows:

$$d = \Sigma_k ((r_{ik} - r_{jk})^2)$$

The similarity degree s is calculated as follows:

$$s32\ 1/(1+d)$$

The larger the similarity degree s, the higher the similarity. For example, a pair of the CID and the similarity s for each of the three high-order pieces of rhythm data $R_j$ in the descending order of the value of s is output to the search result generation section 207.

In the embodiment, the similar rhythm search result as shown in FIG. 9 is output as the result of the calculation. FIG. 9 shows that the CID of the music data with the highest similarity degree is "MUS0003" and the similarity degree is "0.8."

The music-associated information storage section 204 is a function block for retaining information relevant to ringer tone and retaining associated information of the title, composer name, etc., for example, with the identifier for identifying the ringer tone as a key. The music-associated information storage section 204 is implemented as memory of a computer, etc.

In the embodiment, the music-associated information storage section 204 retains data of "title," "music genre," "composer name," "songwriter name," and "URL where music data exists" with the CID of the music identifier as a key, as shown in FIG. 10. The invention is not limited to the format; for example, all information relevant to music and its data, such as the performer name, the album name, the music play time, the data size of ringer tone data, a part or all of words, and the ringer tone data, can be stored.

The search result generation section 207 receives the pairs of the CIDs and the similarity degrees s input from the similar rhythm search section 206, organizes them as output data in the search result output section 208, and outputs the organized output data to the search result output section 208. At the organizing time, any other information which needs to be output as the search result is acquired from the music-associated information storage section 204 based on the CID. The output data is made up of text information, image information, sound information, the score of the similarity degree, etc.

To output the similarity degree, the similarity degree may be normalized so that 0 points mean complete non-similarity and 100 points mean complete match as the score based on the similarity degree s. Accordingly, it is made possible for the searcher to see how much the result matches the input at a glance.

The search result output section 208 receives the search result from the search result generation section 207 and outputs the search result by displaying a character string or an image or playing back music, etc.

In the embodiment, for example, to output an image as shown in FIG. 11 as the search result, "title," "music genre," "composer name," "songwriter name," and "URL where music data exists" are obtained using the CID from the data stored in the music-associated information storage section 204 shown in FIG. 10 and image data is generated in the format shown in FIG. 10 and is output to the display 102 of the mobile telephone 101.

The ringer tone data is downloaded from URL 1 where the data exists from the music-associated information shown in FIG. 10 and is stored in the memory in the mobile telephone, and voice is output from the speaker 111 connected to the mobile telephone 101.

In the description of the embodiment, search for ringer tone in the mobile telephone is taken as an example, but the invention is not limited to it. The invention can also be embodied as a music search apparatus in an apparatus such as a mobile terminal or a CP that can play back/download music.

At this time, if a search is made to play back music data in the mobile terminal, the rhythm data storage section 203 and the music data storage section 201 are storage media such as memory in the mobile terminal, and the similar rhythm search section 206 is implemented as a CPU and a program of the mobile terminal for playing back music data as output.

In the embodiment, the data of "title," "music genre," "composer name," "songwriter name," "URL where music data exists," etc., is obtained with the CID of the music identifier as a key. However, instead, the data of "title," "music genre," "composer name," "songwriter name," "URL where music data exists," etc., maybe obtained with the ID (identifier) of rhythm data as a key.

The search of the invention can also be used for the purpose of calling to play back a musical piece retained in the mobile telephone as the search result.

Only the time information (delta time) where sound rising information in the selected track (note on message) occurs is cut out at (step S503) However, further sound falling information (note off message) may also be cut out and the sound rising information and the sound falling information may be added together to the array as a numeric string. In this case, the rising time and the falling time are recorded alternately in the numeric array, and the data becomes time interval information with sound switched between ON and OFF. To use the rhythm data thus created, likewise, not only the time at which the OFF-to-ON state transition is made, but also the time at which the ON-to-OFF state transition is made is detected at the step where the input rhythm data is generated by the time-series signal input section 205 (step S701). If the data is used, search can be conducted as in the embodiment described above. Accordingly, search making the most of not only the sound rising timing, but also duration information can be conducted.

As described above, according to the invention, the music search apparatus based on rhythm input can be made easier to use and easier to implement.

Second Embodiment

Next, a second embodiment of the invention wherein search is made using both a terminal and a music search apparatus of a server will be discussed.

The difference from the first embodiment will be discussed below:

In the second embodiment, the functions of the function blocks shown in FIG. 2 are installed in both a mobile telephone as of a music search terminal and a music search apparatus as of a server. If the search result of a predetermined similarity degree is not provided in the terminal of the mobile telephone, etc., search is made using the music search apparatus of the server.

Generally, the rhythm data storage section 203 in mobile telephone 101 stores a subset of the data retained in a rhythm data storage section in the music search apparatus of the server, and it is effective to store musical pieces having a high possibility that the musical piece may become the search result. However, the rhythm data storage section 203 is not limited to a subset and the rhythm data of the musical pieces retained by the user and the rhythm data keyed by the user are stored, whereby it is also possible to provide the search result unique to the user.

Figure 12:
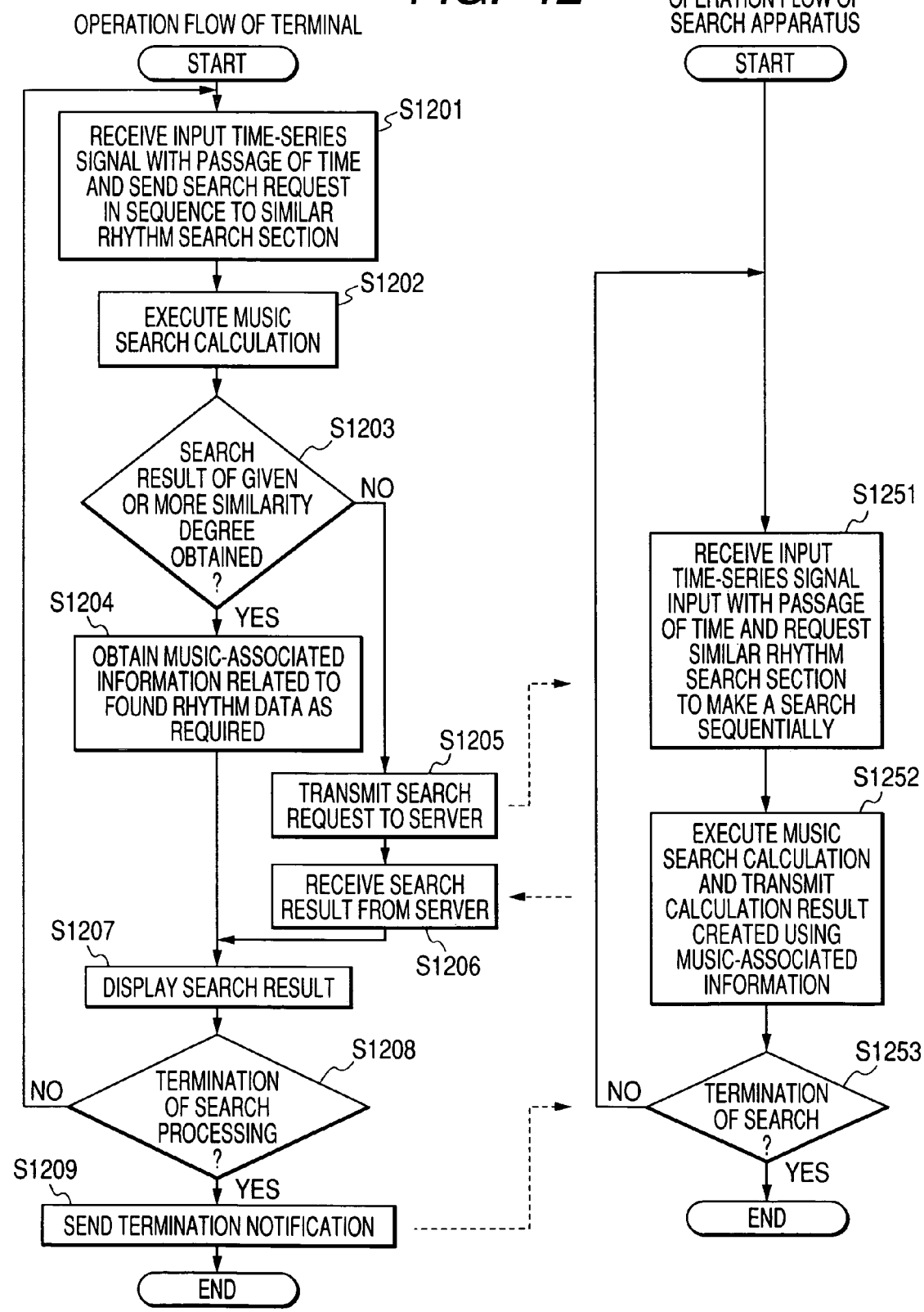
FIG. 12 is a flowchart to describe two-stage search.

FIG. 12 is a flowchart to describe the operation of the music search apparatus. In the description that follows, for the functions in the mobile telephone (music search apparatus), a suffix of T (Terminal) is added to each reference numeral and for the functions in the music search apparatus of the server, a suffix of S (Server) is added to each reference numeral.

In FIG. 12, in the mobile telephone of the terminal (music search apparatus), a time-series signal input section 205T receives a time-series signal with the passage of time and outputs the time-series signal to a similar rhythm search section 206T in the mobile telephone (step S1201). This can be executed in the mobile telephone as an application, such as i-appli (registered trademark in Japan), as follows: For example, a program for detecting an event of a center button being pressed and receiving an input time-series signal forms the time-series signal input section 205T, and rhythm data previously defined as constant data is stored in a scratch pad of a data storage mechanism of the i-appli, thereby forming a rhythm data storage section 203.

In the terminal, the similar rhythm search section 206T formed as an i-appli program, for example, in the mobile telephone references the rhythm data storage section 203T in the mobile telephone and performs search processing similar to that in the first embodiment (step S1202).

In the terminal, if the result of a predetermined similarity degree or more is obtained at step S1202 (Yes at step S1203), a search result generation section 207T uses music-associated information obtained from a music-associated information storage section 204T to generate the search result to be output as the final search result based on the obtained result (step S1204). The predetermined similarity degree mentioned above can be determined 0.9, etc., in the similarity degree with 1 as the maximum value.

In the terminal, if the result of a predetermined similarity degree or more is not obtained at step S1202 (No at step S1203), the time-series signal as a search request is transmitted to the music search apparatus of the server (step S1205).

In the music search apparatus of the server, a rhythm data storage section 203S is referenced and search processing is performed (step S1251) and then the search result to be output as the final search result is generated using music-associated information obtained from a music-associated information storage section 204S and is transmitted to the mobile telephone terminal (step S1252), as in the first embodiment. In the music search apparatus of the server, if the search processing in the terminal is not terminated (No at step S1253), the process returns to step S1251.

In the terminal, the search result is received from the music search apparatus of the server (step S1206).

In the terminal, the obtained search result is output to a display, etc., (step S1207).

In the terminal, to terminate the search processing, a search processing termination notification is sent to the search apparatus via a radio communication line and the processing is terminated (step S128).

As described above, according to the invention, the music search apparatus based on rhythm input can be made easier to use and easier to implement.

Further, in the second embodiment, when the search result of the predetermined similarity degree can be obtained in the mobile telephone terminal, the search result can be obtained without delay caused by communications, etc., so that the search result can be obtained at high speed and further when the search result of the predetermined similarity degree cannot be obtained, the search result is provided by the music search apparatus of the server, so that the search result considered to be more correct can be obtained.

Generally, the server has a margin of the storage capacity as compared with the terminal and thus stores more rhythm data than the terminal. Although it is difficult to perform calculation of search, etc., about large-scaled data in the mobile telephone, as search is executed in the music search apparatus of the server, the user can also obtain the search result for a musical piece whose rhythm data is not retained although a delay is caused by communications, etc.

If the result of the predetermined similarity degree or more can be found in the mobile telephone, the user may be enabled to command the music search apparatus of the server to conduct search.

Third Embodiment

Next, a third embodiment of the invention will be discussed. In the embodiment, the search result is output involving the words, score, syllable names, and sound of the keying portion inputting an input time-series signal.

The difference from the first embodiment will be discussed below:

In the third embodiment, in the process of generating and outputting the search result, a part or all of words, a part or all of syllable names of note of musical piece, a part or all of score, or voice audition data is played back so that the user can keep track of the portion corresponding to an input time-series signal. Accordingly, if the user enters the rhythm pattern of an impressive phrase without knowing the name of a musical piece for searching for the musical piece and several candidates are displayed, it is made possible for the user to easily determine which candidate is his or her desired candidate.

The embodiment is implemented as follows:

In each piece of rhythm data stored in a rhythm data storage section 203, a time stamp indicating the rhythm appears at a time position of how many seconds since the start of the musical piece containing the rhythm is retained. Usually, one time stamp is registered, but two or more time stamps can be registered. In a music-associated information storage section 204, the corresponding portions of words, syllable names, score, voice data are registered by time stamp, whereby each music-associated information can be related to each piece of rhythm data for output. The output is generated as a part of the search result in a search result generation section 207 and is output in a search result output section 208, so that the user can rapidly determine whether or not the search result is as intended according to the words and the musical scale of the portion corresponding to the input time-series signal.

In addition to the method of registering the data by time stamp, for example, if the data is voice data, it is easy to cut out a several-second portion from the specified portion and output the cut-out portion according to a known art, and the voice audition data corresponding to the input portion of the time-series signal by the user can be provided.

The time of the start position for each reasonable portion of words, syllable names, score, etc., is previously tagged as associated information, whereby some words, syllable names, score, etc., containing the input range of the time-series signal by the user can be output.

Alternatively, an output mode wherein all words, syllable names, score, etc., are output and then the input range of the time-series signal by the user is displayed in a different color, etc., rather than the output mode of some words, syllable names, score, etc., is also effective.

As described above, according to the invention, the music search apparatus based on rhythm input can be made easier to use and easier to implement.

Fourth Embodiment

Next, a fourth embodiment of the invention will be discussed. In the embodiment, an input time-series signal at the search time is converted into rhythm data, which is then stored in a rhythm data storage section for reuse for the later search.

The difference from the first embodiment will be discussed below:

In the fourth embodiment, the following mechanism is introduced: An input time-series signal at the search time is converted into rhythm data, which is then stored in a rhythm data storage section 203 for reuse for the later search, thereby enhancing the search accuracy.

The portion wherein the search result of a similar rhythm search section based on a signal received at a time-series signal input section is output in a search result output section is similar to that in the first embodiment.

In the fourth embodiment, further the input time-series signal is converted into the data format of rhythm data for retention in the rhythm data storage section 203.

If the user selects one musical piece from the search result, the retained input time-series signal is converted into the data format of rhythm data and is additionally registered in the rhythm data storage section 203 as one piece of the rhythm data of the selected musical piece. The data format conversion may be executed according to a method similar to the method previously described with reference to FIG. 8 in the first embodiment.

Accordingly, the possibility that the candidate musical piece selected this time may be displayed as a higher-order candidate becomes high in response to a search request with a similar input time-series signal. This makes the most of the nature that the feature for each user is often recognized although rhythm recognition and time-series signal input of the user are not necessarily as the musical score. If the same user executes two or more searches for one musical piece, for example, if the user searches for the musical piece to call the musical piece retained in the terminal, the accuracy is enhanced as compared with the usual case.

As described above, according to the invention, the music search apparatus based on rhythm input can be made easier to use and easier to implement.

Further, in the fourth embodiment, search with higher accuracy can be conducted.

The invention is not limited to the specific embodiment described above and various changes and modifications can be made without departing from the spirit and the scope of the invention.

An information edit apparatus of the invention can be implemented as a program operated in a computer such as a workstation (WS) or a personal computer (PC).

Figure 13:
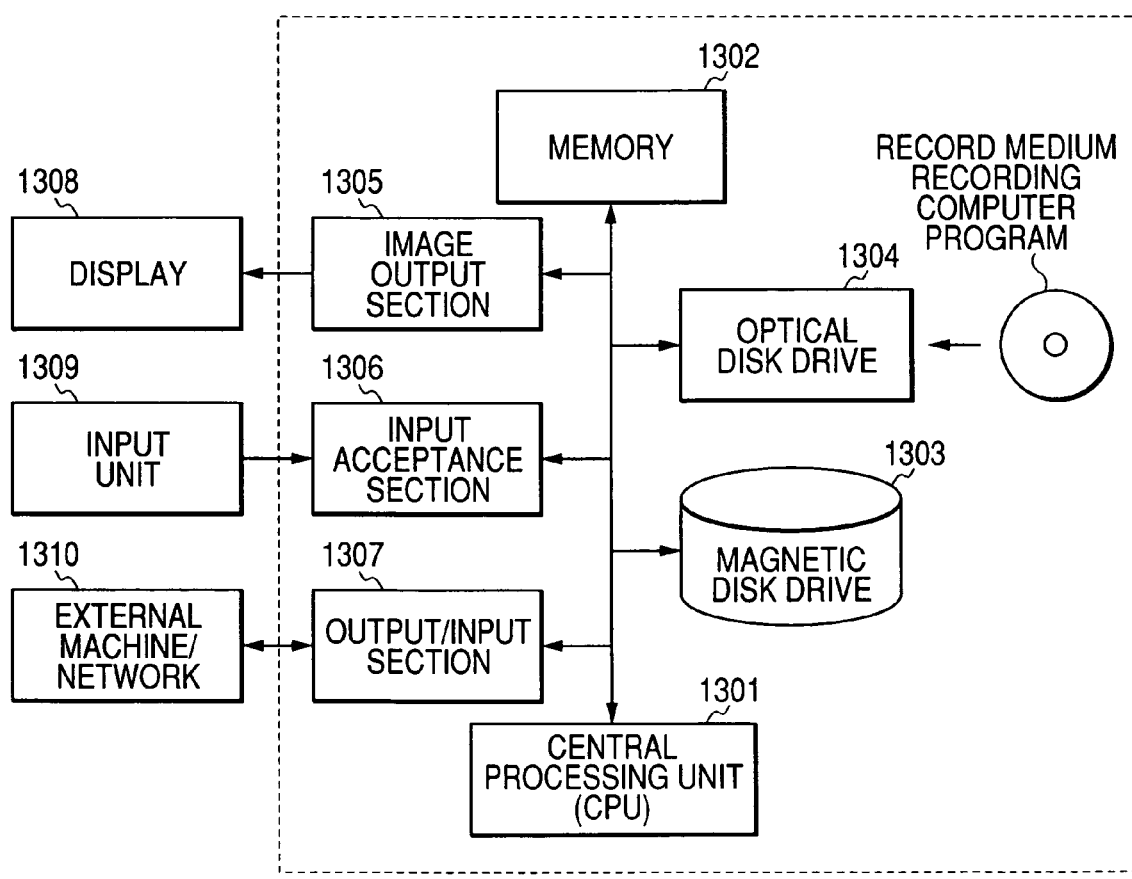
FIG. 13 is a block diagram to show the configuration when the music search apparatus according to the embodiment of the invention is implemented in a computer.

FIG. 13 is a block diagram to show a configuration example when an information edit apparatus (music search apparatus) according to the invention is implemented in a computer. This computer includes a central processing unit 1301 for executing a program, memory 1302 for storing the program and data being processed by the program, a magnetic disk drive 1303 for storing the program, the data to search for, and OS (Operating System), and an optical disk drive 1304 for reading/writing the program and data from/to an optical disk.

The computer further includes an image output section 1305 of an interface for displaying a screen on a display, etc., an input acceptance section 1306 for accepting input from a keyboard, a mouse, a touch panel, etc., and an output/input section 1307 of an output/input interface with an external machine (for example, USB (Universal Serial Bus), a voice output terminal, etc.,). The computer also includes a display 1308 such as an LCD, a CRT, or a projector, an input unit 1309 such as a keyboard or a mouse, and an external machine 1310 such as a memory card reader or a speaker.

The central processing unit 1301 reads the program from the magnetic disk drive 1303 and stores the program in the memory 1302 and then executes the program, thereby implementing the function blocks shown in FIG. 2. During the program execution, a part or all of the data to search for may be read from the magnetic disk drive 1303 and may be stored in the memory 1302.

As the basic operation, a search request made by the user is received through the input unit 1309 and a search is made for the data to search for stored in the magnetic disk drive 1303 or the memory 1302 in response to the search request. The search result is displayed on the display 1308.

The search result not only is displayed on the display 1308, but also may be presented to the user by voice with a speaker connected to the computer as the external machine 1310, for example. Alternatively, the search result may be presented to the user as printed matter with a printer connected to the computer as the external machine 1310.

It is to be understood that the invention is not limited to the specific embodiments described above and that the invention can be embodied with the components modified without departing from the spirit and scope of the invention. The invention can be embodied in various forms according to appropriate combinations of the components disclosed in the embodiments described above. For example, some components may be deleted from all components shown in the embodiment. Further, the components in different embodiments may be used appropriately in combination.

As described with reference to the embodiments, there is provided a music search apparatus including input means that inputs a time-series signal whose on state and off state are repeated alternately; data storage means for storing a plurality of pieces of rhythm data in association with music-associated information associated with music corresponding to the rhythm data; search means for searching the plurality of pieces of rhythm data stored in the data storage means for rhythm data having the same fluctuation pattern as or a similar fluctuation pattern to the time-series signal input to the input means; and search result output means for reading the music-associated information stored in association with the rhythm data found by the search means from the data storage means and outputting the read music-associated information as the search result of the search.

The invention relating to the apparatus also holds as the invention relating to a method and the invention relating to the method also holds as the invention relating to the apparatus.

The invention relating to the apparatus or the method also holds as a program for causing a computer to execute a procedure corresponding to the invention (or causing a computer to function as means corresponding to the invention or causing a computer to provide functions corresponding to the invention) and also holds as a computer-readable record medium recording the program.

According to the invention, the music search apparatus for making it possible to search for music containing a rhythm similar to the rhythm in response to rhythmical ON/OFF change input of a time-series signal and inspect the music information or play back music can be realized.

What is claimed is:

1. A music search system comprising:
a music search apparatus; and
a music search terminal,
wherein the music search apparatus includes:
an input unit that inputs a time-series signal represented by on/off signals;
a data storage unit that stores a plurality of pieces of rhythm data in association with music-associated information associated with music corresponding to the rhythm data;
a search unit that searches the plurality of pieces of rhythm data stored in the data storage unit for rhythm data having the same fluctuation pattern as or a similar fluctuation pattern to the time-series signal input to the input unit; and
a search result output unit that reads the music-associated information stored in association with the rhythm data found by the search unit from the data storage unit and outputs the read music-associated information as the search result of the search,
wherein the music search terminal includes:
a communication unit that communicates with the music search apparatus via a communication line;
a operation unit that inputs the time-series signal to the input unit through the communication unit;
a receiving unit that receives the search result of the input time-series signal through the communication unit from the search result output unit;
a display unit that displays the received search result;
a terminal-side input unit that inputs a time-series signal represented by on/off signals;
a terminal-side data storage unit that stores a plurality of pieces of rhythm data in association with music-associated information associated with music corresponding to the rhythm data;
a terminal-side search unit that searches the plurality of pieces of rhythm data stored in the data storage unit for rhythm data having the same fluctuation pattern as or a similar fluctuation pattern to the time-series signal input to the input unit;
a terminal-side search result output unit that reads the music-associated information stored in association with the rhythm data found by the search unit from the data storage unit and outputs the read music-associated information as the search result of the search;
a determination unit that determines whether or not rhythm data of a predetermined similarity degree or more has been found as the result of the search of the search unit; and
a control unit that controls the display unit so as to display the search result of the terminal-side search unit when rhythm data of the predetermined similarity degree or more has been found as the result of the determination of the determination unit, and controls the display unit so as to display the search result of the search unit of the music search apparatus when rhythm data of the predetermined similarity degree or more has not been found as the result of the determination of the determination unit.

2. The music search system as claimed in claim 1, wherein:
the terminal-side search result output unit outputs the rhythm data found by the terminal-side search unit in addition to the music-associated information as the search result of the search, and
the music search terminal further includes a terminal-side storing unit that stores the rhythm data contained in the search result received through the communication unit in the terminal-side data storage unit.

3. The music search system as claimed in claim 1, wherein:
the data storage unit stores at least one item of music data of syllable names, score, words, and music data as the information associated with music, and
the search result output unit outputs the information associated with music as a part of the search result.

4. A music search system, comprising:
a music search apparatus; and
a music search terminal,
wherein the music search apparatus includes:
an input unit that inputs a time-series signal represented by on/off signals;
a data storage unit that stores a plurality of pieces of rhythm data in association with music-associated information associated with music corresponding to the rhythm data;
a search unit that searches the plurality of pieces of rhythm data stored in the data storage unit for rhythm data having the same fluctuation pattern as or a similar fluctuation pattern to the time-series signal input to the input unit;
a search result output unit that reads the music-associated information stored in association with the rhythm data found by the search unit from the data storage unit and outputs the read music-associated information as the search result of the search;
a calculating unit that calculates excess or deficiency of the input time of the time-series signal in the input unit; and
a calculation output unit that outputs the calculated excess or deficiency,
wherein the music search terminal includes:
a communication unit that communicates with the music search apparatus via a communication line;
a operation unit that inputs the time-series signal to the input unit through the communication unit;

a receiving unit that receives the search result of the input time-series signal through the communication unit from the search result output unit;

a display unit that displays the received search result a terminal-side input unit that inputs a time-series signal represented by on/off signals;

a terminal-side data storage unit that stores a plurality of pieces of rhythm data in association with music-associated information associated with music corresponding to the rhythm data;

a terminal-side search unit that searches the plurality of pieces of rhythm data stored in the data storage unit for rhythm data having the same fluctuation pattern as or a similar fluctuation pattern to the time-series signal inputto the input unit;

a terminal-side search result output unit that reads the music-associated information stored in association with the rhythm data found by the search unit from the data storage unit and outputs the read music-associated information as the search result of the search;

a determination unit that determines whether or not rhythm data of a predetermined similarity degree or more has been found as the result of the search of the search unit; and a control unit that controls the display unit so as to display the search result of the terminal-side search unit when rhythm data of the predetermined similarity degree or more has been found as the result of the determination of the determination unit, and controls the display unit so as to display the search result of the search unit of the music search apparatus when rhythm data of the predetermined similarity degree or more has not been found as the result of the determination of the determination unit.

5. A music search apparatus comprising:

an input unit that inputs a time-series signal represented by on/off signals;

a data storage unit that stores a plurality of pieces of rhythm data in association with music-associated information associated with music corresponding to the rhythm data;

a search unit that searches the plurality of pieces of rhythm data stored in the data storage unit for rhythm data having the same fluctuation pattern as or a similar fluctuation pattern to the time-series signal input to the input unit;

a search result output unit that reads the music-associated information stored in association with the rhythm data found by the search unit from the data storage unit and outputs the read music-associated information as the search result of the search;

a calculating unit that calculates excess or deficiency of the input time of the time-series signal in the input unit; and a calculation output unit that outputs the calculated excess or deficiency.

* * * * *